Frances H. Carrier.
Wash Stand.
PATENTED
DEC 10 1867
N° 71976
Fig. 1.
Fig. 2.
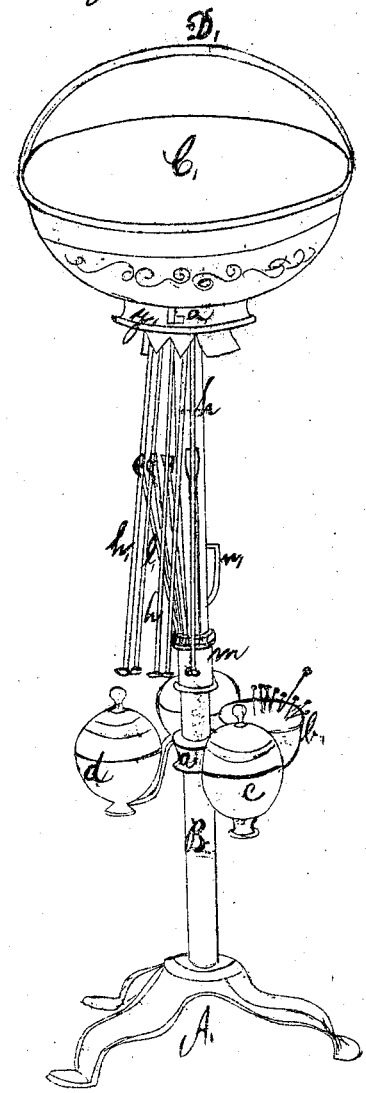
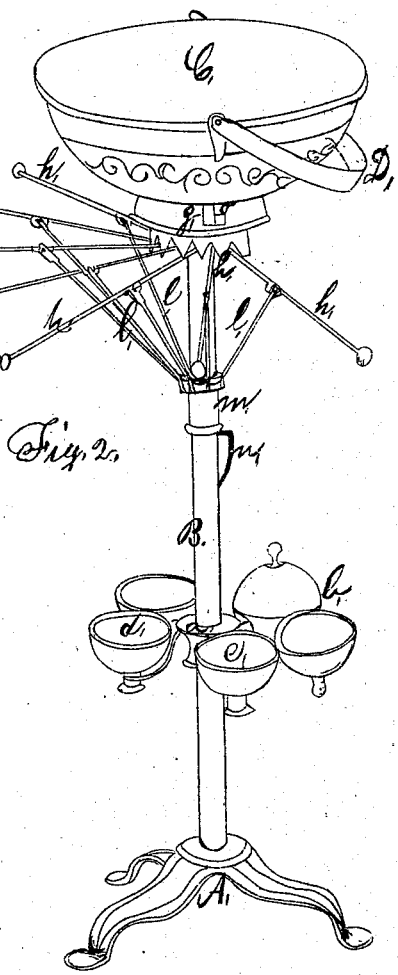
Witnesses,
Samuel Graham
[signature]
Frances H. Carrier
By R. Fitzgerald Atty.

United States Patent Office.

FRANCES H. CARRIER, OF BRIDGEPORT, CONNECTICUT.

Letters Patent No. 71,976, dated December 10, 1867.

IMPROVED WASH-STAND AND CLOTHES-DRIER.

*The Schedule referred to in these Letters Patent and making part of the same.*

TO ALL WHOM IT MAY CONCERN:

Be it known that I, FRANCES H. CARRIER, of the city of Bridgeport, in the county of Fairfield, and State of Connecticut, have invented a new and useful Improvement in Wash-Stand or Toilet-Apparatus; and I do hereby declare that the following is a full, clear, and exact description of the construction, character, and operation of the same, reference being had to the accompanying drawings, which make part of this specification, in which—

Figure 1 is a perspective view of the whole apparatus, showing the wash-basin in its place, the clothes-bars or arms let or closed down, and the cup or box containing the pin-cushion open, and the other cups or boxes closed.

Figure 2 is a perspective view of the same, with the clothes-bars or arms extended, and two of the cups or boxes for containing soap, &c., open.

My improvement consists in combining in one article of chamber-furniture, a wash-stand and basin, vessels for holding soap and other toilet-articles, and clothes-drier, so that the whole may be readily handled with one hand, by means of a bail, or otherwise.

I make the pedestal, on which the whole rests, of cast iron, or any other suitable material, in the form of a tripod, as shown at A, figs. 1 and 2, or of any other convenient form. I make the shaft or pillar of metal tubing, or any other suitable material of a cylindrical form, as shown at B, figs. 1 and 2, or of any other shape which convenience or taste may dictate, with a cap upon its upper end, fitted to receive a suitable wash-basin or bowl, as shown at g, figs. 1 and 2. At a short distance above the tripod I fit a suitable collar, as shown at a, figs. 1 and 2, either revolving or fixed, as may be found most convenient. To this collar I attach any convenient number of cups or boxes, as shown at b c d, or of any other form, or the whole circle may be made as one vessel, and divided into any convenient number of apartments, of any desired size or depth, to accommodate a nursery, or a lady's or gentleman's dressing-room, or a sick-chamber; and more than one collar and its appendages may be used if deemed best. To a suitable collar near the top, and directly under the cap g, I attach any convenient number of arms or bars, as h, &c., by means of joint-pins, (in the manner of rods or stretchers for an umbrella,) with which bars or arms I connect suitable braces, as shown at l, &c., the lower ends of which braces I attach, by joint-pins, to a sliding collar, as shown at m, so that, by pushing the collar m upward, from the position shown in fig. 1 to that shown in fig. 2, the position of the bars or arms h, &c., will be changed from that shown in fig. 1 to that shown in fig. 2, and thus constitute a clothes-drier, which bars, when not wanted, can be let down to the position shown in fig. 1, in the manner of closing an umbrella. I make the wash-basin or bowl of sheet metal, substantially in the form shown at C, with a flange at the bottom, which serves as feet when needed, and which sets into the cap g, in which it may be secured by lock-joints on each side, one of which is shown at o, figs. 1 and 2, so that the whole apparatus may be taken up by the bail D, and moved from place to place at pleasure.

What I claim as my invention, and desire to secure by Letters Patent, is—

1. The combination of the clothes-drying apparatus with the wash-basin, when they are constructed, arranged, and fitted for use substantially as herein described and set forth.

2. I claim the combination of the cups b c d, or their equivalents, with the wash-basin, when they are constructed, arranged, and fitted for use as a toilet-apparatus, substantially as herein described and set forth.

FRANCES H. CARRIER.

Witnesses:
JOSHUA LORD,
EPHRAIM CURTIS.